F. G. MERRIAM.
ENAMEL FOR TOBACCO-PIPES.
No. 169,827.          Patented Nov. 9, 1875.
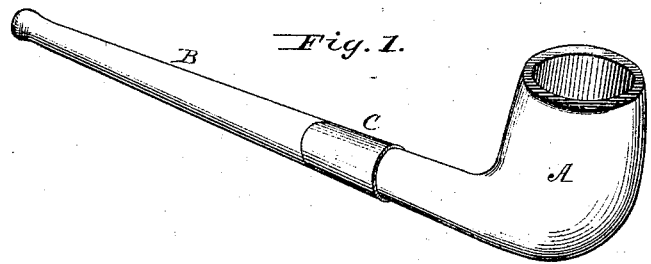
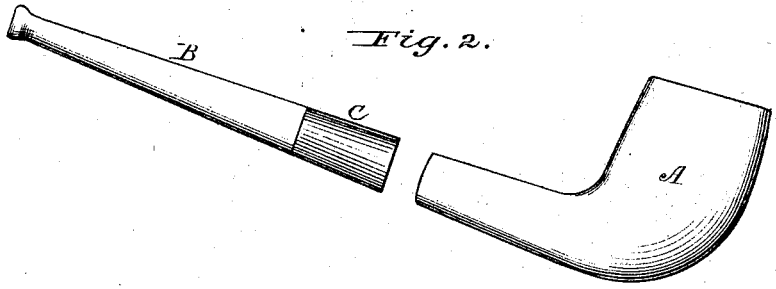
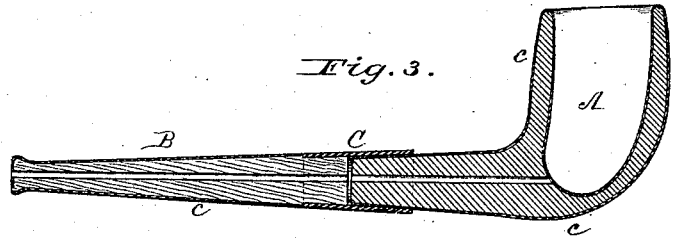

UNITED STATES PATENT OFFICE.

FLAVEL G. MERRIAM, OF AKRON, OHIO.

IMPROVEMENT IN ENAMEL FOR TOBACCO-PIPES.

Specification forming part of Letters Patent No. 169,827, dated November 9, 1875; application filed October 16, 1875.

*To all whom it may concern:*

Be it known that I, FLAVEL G. MERRIAM, of Akron, in the county of Summit and State of Ohio, have invented certain new and useful Improvements in Tobacco-Pipes, of which the following is a specification:

This invention relates to certain improvements in enameling pipes composed of clay, earthenware, or other aluminous and vitreous compounds, and the stems of the same, whether composed of the same material as the bowl, or of wood or other material, its object being to form on such articles a hard and indestructible enamel coating, that may be cheaply applied, and by means of which the expensive materials commonly used in the manufacture of pipes, such as meerschaum, rosewood, briar-wood, tortoise-shell, &c., can be successfully imitated; and it consists in an enamel compound of such nature that, when applied to the bowls or stems of the pipes, and properly hardened thereon, it will fill the pores of the material of which they are composed, and prevent the absorption of the essential oils of the tobacco, and which will form a highly-polished and beautifully-finished surface on the articles. The said enamel consists of a body or ground compound composed of linseed-oil, burnt umber, asphaltum, gum-copal, black oxide of manganese, and Prussian blue, which is applied to the pipe first, and thoroughly baked or hardened upon the same, successive applications being applied until a coating of sufficient thickness and brilliancy is obtained, said ground or body color producing a brilliant black surface, resembling polished ebony, the surface of which may be finished to imitate rosewood, tortoise-shell, meerschaum, or other expensive materials, by applying over said body or ground color various pigments, combined with benzine, or naphtha, or linseed-oil, as hereinafter more fully set forth.

In carrying out my invention, I take of linseed-oil about ten gallons, burnt umber about seven pounds, asphaltum about fifteen pounds, gum-copal about six pounds, black oxide of manganese about seven pounds, and Prussian blue about ten pounds. These substances are intimately mixed and commingled with the aid of heat until they form a uniform and homogeneous black compound, sufficient naphtha being then added to allow the compound to be readily applied to the articles. This forms the body or ground enamel, and is applied to the pipes by dipping the same therein or otherwise coating them, the enamel being afterward hardened thereon by baking at a high temperature. Successive applications of this body or ground compound are applied to the articles until the same are properly saturated and the desired depth and brilliancy of color obtained. The body or ground enamel thus formed and applied gives the article the appearance of polished ebony, and the articles may be put in the market without further finish, but when it is desired to imitate the expensive materials of which pipes are commonly constructed, variously colored pigments, combined with linseed-oil or naphtha, are applied to the articles as thus prepared with the enamel-body compound over said body compound.

The following-named pigments I have found to successfully imitate the various woods and materials of which tobacco-pipes are usually made, viz: For rosewood, western-red; for brown, Venetian red; for meerschaum, chrome-yellow; for tortoise-shell, chrome-yellow and western-red; for maroon, carmine-lake.

The above-mentioned pigments are mixed with linseed-oil, naphtha, benzine, or turpentine, until they are brought to proper consistency for application to the articles, and are applied by means of a brush, or in any other convenient manner, and hardened or baked on in the same manner as the body color.

It is evident that the proportions of the ingredients may be considerably varied without changing the character of my invention, the invention consisting essentially of an enamel coating for earthenware or other aluminous or vitrifiable pipes, which will resist the temperature of the pipe when in use, as described.

In the drawing, Figure 1 represents a perspective view of a pipe constructed in two parts, showing the bowl and stem connected together. Fig. 2 represents a perspective view, showing the bowl and stem separated, and Fig. 3 represents a sectional view of a pipe constructed according to my invention.

The letter A represents the bowl of the pipe,

B the stem, and C the ferrule or sleeve by which the two are secured together. The letter c, Fig. 3, represents the enamel coating on the stem and bowl. The bowl A is constructed of clay, earthenware, or other aluminous material, and it is evident that the pipe may be constructed of clay or earthenware, complete in one piece.

Having thus described my invention, what I claim, and desire to secure by Letters Patent, is—

1. A composition enamel for enameling the bowls or stems of pipes composed of clay, earthenware, or other aluminous or vitrifiable material, consisting of linseed-oil, burnt umber, asphaltum, gum-copal, black oxide of manganese, and Prussian blue, combined in about the proportions substantially as set forth.

2. In combination with the body or ground enamel for coating the stems and bodies of pipes composed of earthenware or other aluminous or vitrified materials, the colored enamel compounds, as set forth, applied over said body enamel, substantially as described.

In testimony that I claim the foregoing I have hereunto set my hand in the presence of the subscribing witnesses.

FLAVEL G. MERRIAM.

Witnesses:
JAMES L. NORRIS,
JOS. L. COOMBS.